(12) United States Patent
Song et al.

(10) Patent No.: US 8,396,686 B2
(45) Date of Patent: Mar. 12, 2013

(54) MEASURE ENERGY CONSUMPTION AND DETERMINE ENERGY-CONSUMPTION PATTERNS FOR ELECTRICITY-CONSUMING DEVICES

(75) Inventors: Zhexuan Song, Sunnyvale, CA (US); Indradeep Ghosh, Cupertino, CA (US)

(73) Assignee: Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 13/085,803

(22) Filed: Apr. 13, 2011

(65) Prior Publication Data

US 2012/0265357 A1    Oct. 18, 2012

(51) Int. Cl.
*G06F 1/26* (2006.01)
(52) U.S. Cl. ...................................................... 702/177
(58) Field of Classification Search ............... 702/177
See application file for complete search history.

(56) References Cited

U.S. PATENT DOCUMENTS

| 2011/0061014 A1 | 3/2011 | Frader-Thompson et al. ............... 715/771 |
| 2011/0072293 A1 | 3/2011 | Mazzaferri et al. ........... 713/340 |

FOREIGN PATENT DOCUMENTS

| WO | WO 2008/131781 A2 | 6/2008 |
| WO | WO 2009/097400 A1 | 6/2009 |

OTHER PUBLICATIONS

Anuj Tewari, Envismo: A Mobile Platform for Collecting and Visualizing Energy Usage Data, CS262A—Fall 2008, 10 pages.*
Kulkarni, Anand Sunil, et al., "A review of electricity monitoring and feedback systems", Southeastern, 2011 Proceedings of IEEE, XP 031943078, ISBN: 978-1-61284-739-9, pp. 321-326, Mar. 17, 2011.
EPO, Communication, European Search Report, and Annex to the European Search Report on European Patent Application No. 12164138.5-1238, 10 pages, Aug. 1, 2012.

* cited by examiner

Primary Examiner — Tung S Lau
(74) Attorney, Agent, or Firm — Baker Botts L.L.P.

(57) ABSTRACT

In one embodiment, one or more electronic devices access energy-consumption data at each of a plurality of electricity-consuming devices, the energy-consumption data at each of the electricity-consuming devices indicating for each of a plurality of past pre-determined time periods an aggregate energy usage by the electricity-consuming device over the past pre-determined time period, an energy-measurement unit at the electricity-consuming device having measured and recorded the aggregate energy usage by the electricity-consuming device for each of the past pre-determined time periods for later access, each of the energy-measurement units having a substantially unique identifier (ID), each of the electricity-consuming devices having its own one of the energy-measurement units; and based on the energy-consumption data, determine one or more energy-consumption patterns across the electricity-consuming devices over at least the past pre-determined time periods.

13 Claims, 4 Drawing Sheets

MEASURE ENERGY CONSUMPTION AND DETERMINE ENERGY-CONSUMPTION PATTERNS FOR ELECTRICITY-CONSUMING DEVICES

TECHNICAL FIELD

This disclosure generally relates to managing energy consumption for electricity-consuming devices.

BACKGROUND

Saving energy is becoming increasingly important due to environmental and other concerns. With smart energy solutions (e.g., employing ecological and cost-effective approaches to solving energy needs), it is desirable to understand the energy-consumption or electricity-consumption patterns of an electricity-consuming device before designing a reasonable model and consumption prediction algorithms for the device.

DESCRIPTION OF EXAMPLE EMBODIMENTS

For various energy related applications, it is desirable to understand the energy-consumption or electricity-consumption patterns of a single electricity-consuming device or across multiple electricity-consuming devices. Currently, there are methods to measure the energy consumption of an electricity-consuming device (e.g., Kill-A-Watt electricity usage monitors), but all such methods are bound to specific electricity outlets. This means that if a device is unplugged from one outlet and then plugged into another outlet, the information collected from the first outlet becomes irrelevant to the device. Consequently, it is difficult to get an overall map of the electricity consumption of the device. In addition, if multiple electricity-consuming devices are connected to the same output (e.g., by using an extension cord or power strip), it is unlikely to obtain accurate readings for each individual device.

Particular embodiments couple an electricity-measurement unit to each electricity-consuming device so that the electricity-measurement unit may collect the energy-consumption or energy-usage information for the associated electricity-consuming device. If the device is moved from one outlet to another, its associated electricity-measurement unit moves with the device and the collection of the energy-consumption information for the device is uninterrupted. In addition, in particular embodiments, an electricity-consumption reader may collect the energy-consumption information of multiple electricity-consuming devices and determine energy-consumption patterns for individual devices or across multiple devices.

Figure 1:
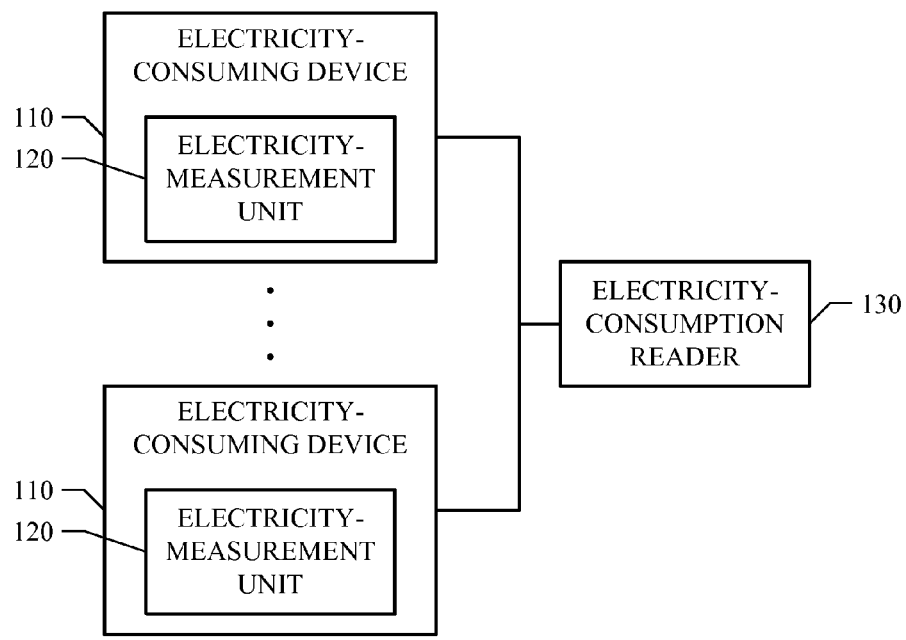
FIG. 1 illustrates a first example system that includes a number electricity-consuming devices.
Figure 2:
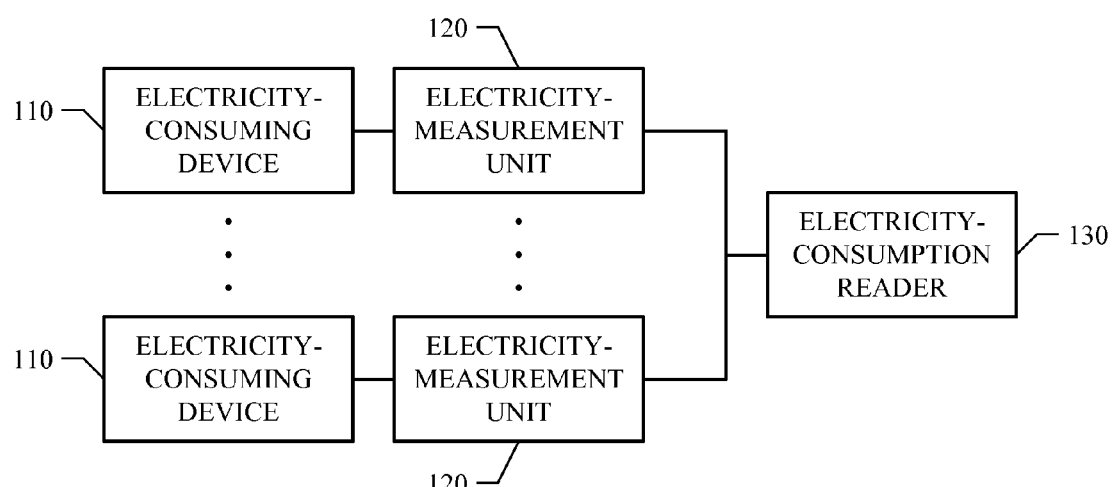
FIG. 2 illustrates a second example system that includes a number electricity-consuming devices.

FIGS. 1 and 2 illustrate two example systems, each including a number of electricity-consuming devices 110. There may be any number (e.g., one or more) of electricity-consuming devices 110 in a system, and there may be different types of electricity-consuming devices 110 in a system. For example and without limitation, an electricity-consuming device 110 may be a home appliance (e.g., television, refrigerator, stove, oven, toaster, dish washer, laundry washer, or laundry dryer), a computing or electronic device (e.g., desktop computer, notebook computer, printer, telephone, or server), or an electricity-consuming system (e.g., air conditioning system, or lighting system). This disclosure contemplates any type of electricity-consuming devices 110.

In particular embodiments, each electricity-consuming device 110 is coupled to an electricity-measurement unit 120. There may be different ways to couple an electricity-consuming device 110 and an electricity-measurement unit 120, and this disclosure contemplates any suitable coupling means. In the example system illustrated in FIG. 1, an electricity-measurement unit 120 may be incorporated in an electricity-consuming device 110 (e.g., as a component of the electricity-consuming device 110). Alternatively, in the example system illustrated in FIG. 2, an electricity-measurement unit 120 may be an independent device and is connected to an electricity-consuming device 110. For example, an electricity-measurement unit 120 may be incorporated in a power cord or power strip connecting the associated electricity-consuming device 110 to a power-supplying source (e.g., outlet). In particular embodiments, electricity supplied to an electricity-consuming device 110 goes through its associated electricity-measurement unit 120 first.

In particular embodiments, an electricity-measurement unit 120 includes an electricity-measurement component, a calculation component, a storage component, and a communication component. The electricity-measurement component may record the total electricity current flowing through it to the associated electricity-consuming device 110 at a given time. In one implementation, the electricity-measurement component may incorporate a power-consumption or current sensor. The calculation component may compute the total energy usage for the associated electricity-consuming device 110 at a given time. By knowing the voltage of the supplied electricity (e.g., 110V or 220V), the total energy usage may be computed based on the total electricity current. The communication component may aggregate the readings based on a predefined or user-specified frequency or time period, such as, for example and without limitation, each minute, hour, or day. For example, the energy usage may be measured in watts hour or kilowatts hour. There may be a default frequency or time period, which may be customized or adjusted by a user. The energy usage information of the associated electricity-consuming device 110 may be stored in the storage component.

In particular embodiments, each electricity-measurement unit 120 has a unique or substantially unique identifier (ID). For example and without limitation, the identifier of an electricity-measurement unit 120 may be its Internet Protocol (IP) or Media Access Control (MAC) address, or a Universally Unique Identifier (UUID). This disclosure contemplates any suitable means to uniquely identify an electricity-measurement unit 120. Each electricity-measurement unit 120 may be identified by its unique ID (e.g., especially when there are multiple electricity-measurement units 120 in a system).

In particular embodiments, an electricity-consumption reader 130 may collect energy-usage information of each electricity-consuming device 110 from its associated electricity-measurement unit 120. The energy-usage information collected from a specific electricity-measurement unit 120 may be identified by the ID of that electricity-measurement unit 120 so that electricity-consumption reader 130 may determine which energy-usage information is of which electricity-consuming device 110. Electricity-consumption reader 130 may communicate with each electricity-measurement unit 120 through a wire-line or wireless connection. For example and without limitation, electricity-consumption reader 130 may communicated with an electricity-measurement unit 120 through a Universal Serial Bus (USB) connection or a Wi-Fi, Bluetooth, Zigbee, or infra-red (IR) connection.

More specifically, in particular embodiments, the communication component of an electricity-measurement unit 120 may implement a communication protocol for communicating with electricity-consumption reader 130. The communication component of an electricity-measurement unit 120 may retrieve the energy-usage information from the storage component of the electricity-measurement unit 120 and send it to electricity-consumption reader 130 from time to time or upon request. In one implementation, there may be a standard communication interface between electricity-consumption reader 130 and each electricity-measurement unit 120 in the system. In this case, electricity-consumption reader 130 may retrieve energy-consumption information from each electricity-measurement unit 120 using the same communication protocol or method.

In the example systems illustrated in FIGS. 1 and 2, electricity-consumption reader 130 is an independent device separate from electricity-consuming devices 110 or electricity-measurement units 120. In this case, a single electricity-consumption reader 130 may collect energy-usage information of multiple electricity-consuming devices 110 through their associated electricity-measurement units 120 respectively. Alternatively, in particular embodiments, an electricity-consumption reader 130 may be incorporated in an electricity-measurement measurement unit 120 or an electricity-consuming device 110 (e.g., as a component of the electricity-measurement unit 120 or electricity-consuming device 110). In this case, the electricity-consumption reader 130 may retrieve the energy-usage information of is associated electricity-consuming device 110 directly from the storage component of its associated electricity-measurement unit 120.

In particular embodiments, electricity-consumption reader 130 may display the energy-consumption information of individual electricity-consuming devices 110 to a user. For example, electricity-consumption reader 130 may include a display component (e.g., a screen) for displaying the energy-consumption information of the electricity-consuming devices 110 directly to the user. Alternatively, electricity-consumption reader 130 may be network-capable and connected to a network so that the energy-consumption information may be displayed to the user indirectly through a web-based service (e.g., Google Power Meter Service).

In addition, in particular embodiments, electricity-consumption reader 130 may aggregate the energy-consumption information of electricity-consuming devices 110 to determine one or more energy-consumption patterns for a single electricity-consuming device 110 or across multiple electricity-consuming devices 110. The energy-consumption patterns may also be displayed to a user directly or indirectly. In one implementation, electricity-consumption reader 130 may include a software component for aggregating the energy-consumption information and determining the energy-consumption patterns. By providing a unique ID to each electricity-measurement unit 120, the software component of electricity-consumption reader 130 may determine which set of energy-consumption information belongs to which electricity-consuming device 110. The software component may be able to determine which specific electricity-consuming devices 110 in the system whose associated electricity-measurement units 120 are connected to electricity-consumption reader 130 and their arrangement or configuration (e.g., the topology of the system).

Figure 3:
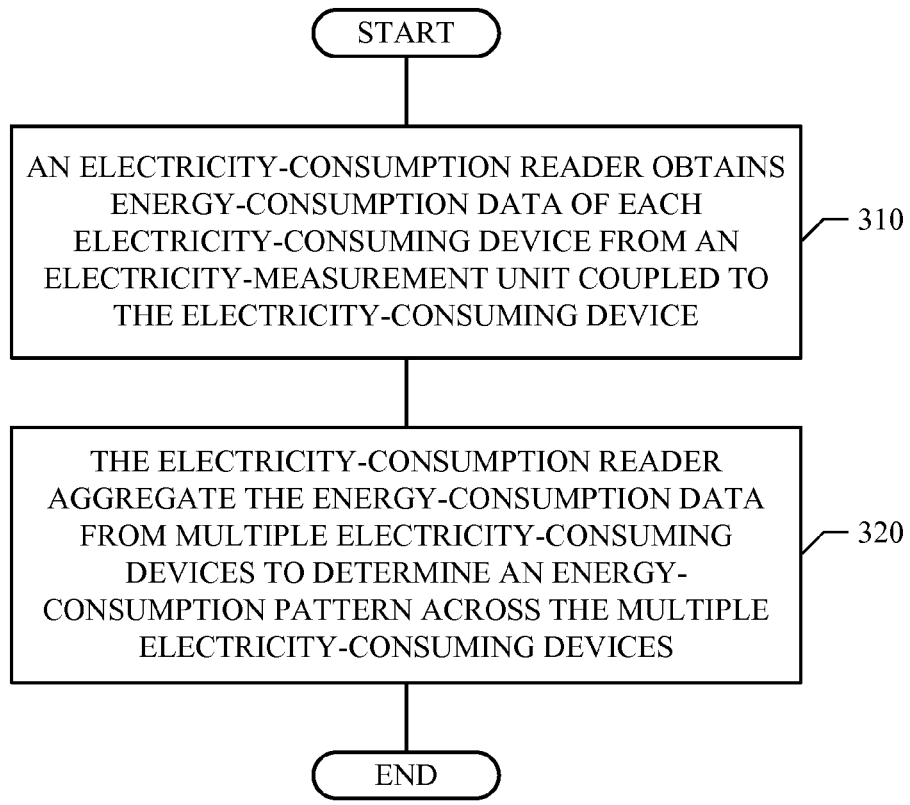
FIG. 3 illustrates an example method for determining energy-consumption patterns for electricity-consuming devices.

FIG. 3 illustrates an example method for determining energy-consumption patterns for electricity-consuming devices. In particular embodiments, an electricity-consumption reader may obtain energy-consumption information of an electricity-consuming device from an electricity-measurement unit associated with and coupled to the electricity-consuming device, as illustrated in STEP 310. If there are multiple electricity-consuming devices, the electricity-consumption reader may obtain energy-consumption information of each of the available electricity-consuming devices. The energy-consumption information of an electricity-consuming device may be for a specific period of time (e.g., a minute, an hour, or a day) and may be identified by a unique ID of the electricity-measurement unit associated with and coupled to the electricity-consuming device.

In particular embodiments, the electricity-consumption reader may aggregate the energy-consumption information of the electricity-consuming devices to determine energy-consumption patters for a single electricity-consuming device or across multiple electricity-consuming devices, as illustrated in STEP 320. For example, given a specific electricity-consuming device, the electricity-consumption reader may aggregate multiple sets of energy-consumption information of the electricity-consuming device (e.g., energy-consumption information of the electricity-consuming device during different times of a day or different days of a week) to determine energy-consumption patterns for the electricity-consuming device. As another example, if there are multiple electricity-consuming devices, then the electricity-consumption reader may aggregate multiple sets of energy-consumption information of one or more available electricity-consuming devices to determine energy-consumption patterns for the multiple electricity-consuming devices.

The method illustrated in FIG. 3 has many practical applications. For example, the electricity-consuming devices may be servers in a data center or a server farm, in which case the energy-consumption patterns of the data center or server farm may be determined. As another example, electricity-consuming devices may be devices in a room, a house, a floor of a build, an entire building, or a neighborhood, in which case the energy-consumption patterns of the room, house, floor, building, or neighborhood may be determined.

Sometimes, an electricity-consuming device may receive power from an internal or external battery. The life of the battery is related to the total length of time (e.g., number of hours) the battery supplies power to the electricity-consuming device and the amount of charge the battery holds. The method illustrated in FIG. 3 may also be used to estimate the life expectation of the battery or the electricity-consuming device.

Figure 4:
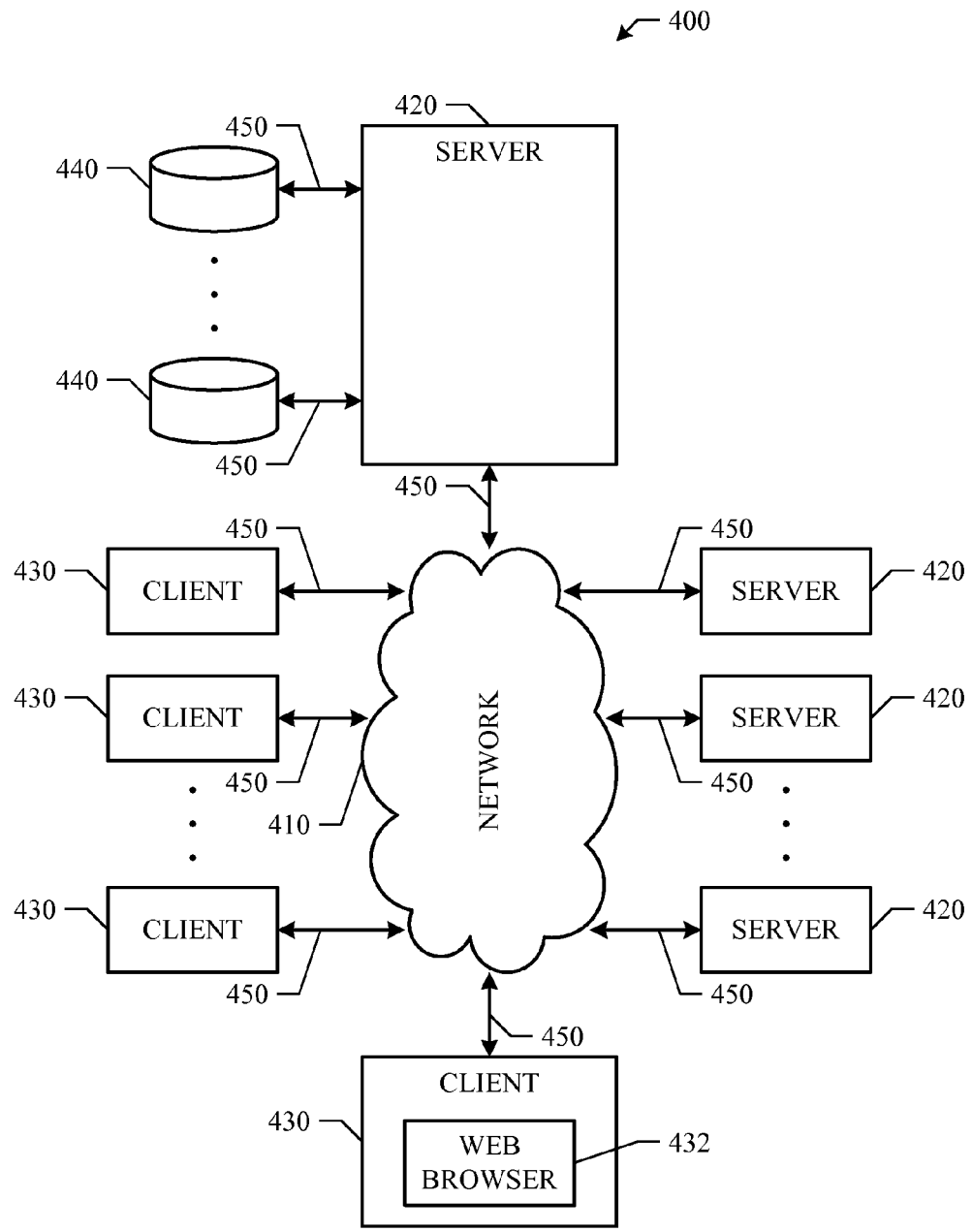
FIG. 4 illustrates an example network environment.

Particular embodiments may be implemented in a network environment. FIG. 4 illustrates an example network environment 400. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a portion of the Internet, or another network 410 or a combination of two or more such networks 410. This disclosure contemplates any suitable network 410.

One or more links 450 couple a server 420 or a client 430 to network 410. In particular embodiments, one or more links 450 each includes one or more wireline, wireless, or optical links 450. In particular embodiments, one or more links 450 each includes an intranet, an extranet, a VPN, a LAN, a WLAN, a WAN, a MAN, a portion of the Internet, or another link 450 or a combination of two or more such links 450. This disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores.

In particular embodiments, one or more data storages 440 may be communicatively linked to one or more severs 420 via one or more links 450. In particular embodiments, data storages 440 may be used to store various types of information. In particular embodiments, the information stored in data storages 440 may be organized according to specific data structures. In particular embodiments, each data storage 440 may be a relational database. Particular embodiments may provide interfaces that enable servers 420 or clients 430 to manage, e.g., retrieve, modify, add, or delete, the information stored in data storage 440.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. This disclosure contemplates any suitable clients 430. A client 430 may enable a network user at client 430 to access network 430. A client 430 may enable its user to communicate with other users at other clients 430.

A client 430 may have a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 430 may enter a Uniform Resource Locator (URL) or other address directing the web browser 432 to a server 420, and the web browser 432 may generate a Hyper Text Transfer Protocol (HTTP) request and communicate the HTTP request to server 420. Server 420 may accept the HTTP request and communicate to client 430 one or more Hyper Text Markup Language (HTML) files responsive to the HTTP request. Client 430 may render a web page based on the HTML files from server 420 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 5:
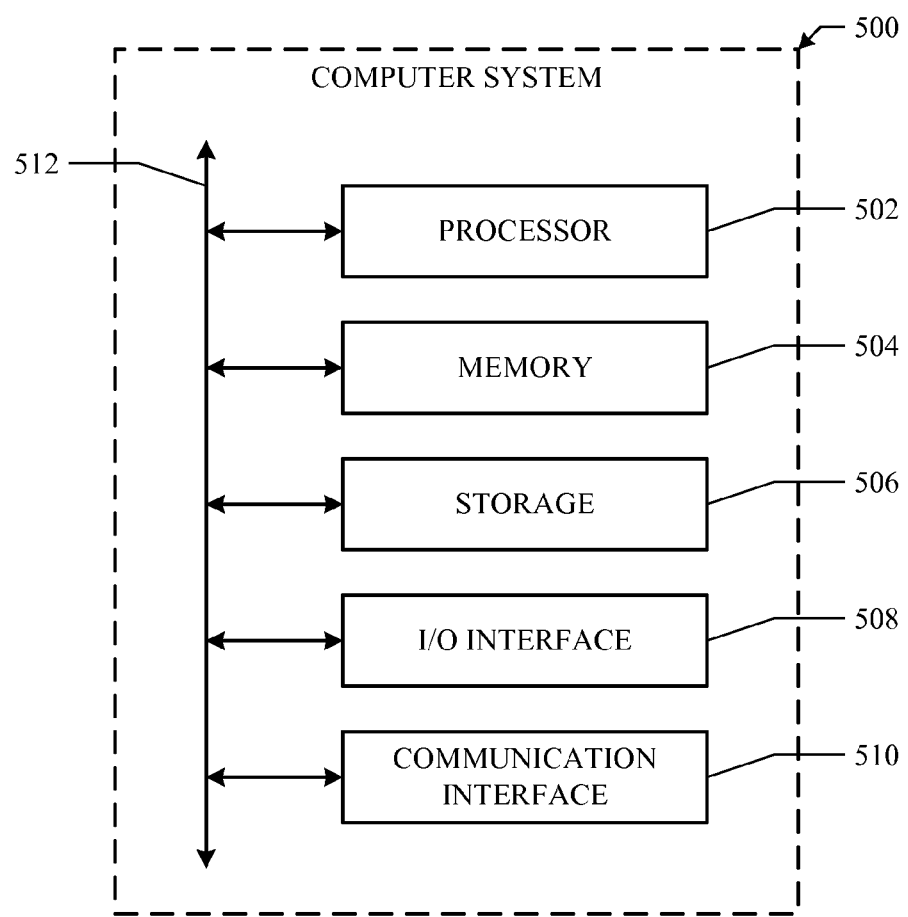
FIG. 5 illustrates an example computer system.

Particular embodiments may be implemented on one or more computer systems. FIG. 5 illustrates an example computer system 500. For example, system 500 may be an electricity-consumption reader illustrated in FIGS. 1 and 2. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
   accessing energy-consumption data at each of a plurality of electricity-consuming devices, the energy-consumption data at each of the electricity-consuming devices indicating for each of a plurality of past pre-determined time periods an aggregate energy usage by the electricity-consuming device over the past pre-determined time period, an energy-measurement unit at the electricity-consuming device having measured and recorded the aggregate energy usage by the electricity-consuming device for each of the past pre-determined time periods for later access, each of the energy-measurement units having a substantially unique identifier (ID), each of the electricity-consuming devices having its own one of the energy-measurement units; and
   based on the energy-consumption data, determining one or more energy-consumption patterns across the electricity-consuming devices over at least the past pre-determined time periods.

2. The method of claim 1, wherein accessing energy-consumption data comprise an electricity-consumption reader reading the energy-consumption data from the energy-measurement units, the electricity-consumption reader being separate from the electricity-consuming devices.

3. The method of claim 2, wherein the electricity-consumption reader is operable to read the energy-consumption data from the energy-measurement units wirelessly.

4. The method of claim 3, the electricity-consumption reader is operable to read the energy-consumption data from the energy-measurement units wirelessly using one or more of a WI-FI connection, a BLUETOOTH connection, a ZIG-BEE connection, or an infra-red (IR) connection.

5. The method of claim 1, wherein each of one or more of the energy-measurement units is part of one of the electricity-consuming devices.

6. The method of claim 1, wherein each of one or more of the energy-measurement units is separate from but connected to one of the electricity-consuming devices.

7. The method of claim 6, wherein each of one or more of the energy-measurement units that is separate from but connected to one of the electricity-consuming devices is part of a power cord connecting the electricity-consuming device to a source of electricity.

8. The method of claim 1, wherein the substantially unique ID is an Internet Protocol (IP) address or a Universally Unique Identifier (UUID).

9. The method of claim 1, wherein measuring an aggregate energy usage by an electricity-consuming device for a pre-determined time period comprises calculating the aggregate energy usage by the electricity-consuming device for the pre-determined time period.

10. The method of claim 1, wherein aggregate energy usage is measured in watts hour or kilowatts hour.

11. The method of claim 1, wherein each of the pre-determined time periods has a length of one minute, one hour, or one day.

12. The method of claim 1, wherein each of the pre-determined time periods has a length that is adjustable by a user.

13. The method of claim 1, wherein the electricity-consuming devices are servers in a data center.

* * * * *